United States Patent
Sillankorva

(10) Patent No.: US 10,348,644 B2
(45) Date of Patent: Jul. 9, 2019

(54) FEEDBACK MECHANISM FOR MULTICAST PROTOCOLS

(71) Applicant: ARM Ltd, Cambridge (GB)

(72) Inventor: Simo Mikael Sillankorva, Oulu (FI)

(73) Assignee: ARM Limited, Cambridge (GB)

( * ) Notice: Subject to any disclaimer, the term of this patent is extended or adjusted under 35 U.S.C. 154(b) by 89 days.

(21) Appl. No.: 15/492,266

(22) Filed: Apr. 20, 2017

(65) Prior Publication Data

US 2017/0317952 A1    Nov. 2, 2017

(30) Foreign Application Priority Data

Apr. 29, 2016   (GB) .................................. 1607582.2

(51) Int. Cl.
| | |
|---|---|
| *H04L 12/931* | (2013.01) |
| *H04L 25/05* | (2006.01) |
| *H04L 12/825* | (2013.01) |
| *H04L 29/06* | (2006.01) |
| *H04L 29/08* | (2006.01) |
| *H04L 12/933* | (2013.01) |

(52) U.S. Cl.
CPC ............ *H04L 49/201* (2013.01); *H04L 25/05* (2013.01); *H04L 47/263* (2013.01); *H04L 67/125* (2013.01); *H04L 69/22* (2013.01); *H04L 69/28* (2013.01); *H04L 49/1584* (2013.01); *H04L 67/12* (2013.01)

(58) Field of Classification Search
CPC combination set(s) only.
See application file for complete search history.

(56) References Cited

U.S. PATENT DOCUMENTS

| | | | |
|---|---|---|---|
| 6,850,488 B1 * | 2/2005 | Wesley | H04L 12/1881 370/230 |
| 2008/0120501 A1 * | 5/2008 | Jannink | G06F 17/30017 713/163 |
| 2013/0163444 A1 | 6/2013 | Tee et al. | |

(Continued)

FOREIGN PATENT DOCUMENTS

WO    WO 2004/075511    9/2004

OTHER PUBLICATIONS

Combined Search and Examination Report for GB1607582.2 dated Dec. 13, 2016, 5 pages.

*Primary Examiner* — Hicham B Foud
(74) *Attorney, Agent, or Firm* — Nixon & Vanderhye P.C.

(57) ABSTRACT

Example embodiments provide apparatus, systems and methods to optimize a multicasting operation used to transmit data packets in a communication network. A data store stores at least one variable parameter associated with the multicasting operation. A communication transceiver multicasts a data packet to a plurality of nodes in a communication network using the stored variable parameter and receives, from a node of the plurality of nodes, a retransmitted version of the multicast data packet, the retransmitted data packet comprising feedback data. At least one processor coupled to the data store and the communication transceiver determines, using the feedback data, that the variable parameter requires modification to optimize the multicasting operation for the network, modifies the variable parameter in response to the feedback data; and stores the modified variable parameter in the data store.

20 Claims, 7 Drawing Sheets

(56) References Cited

U.S. PATENT DOCUMENTS

2014/0244836 A1    8/2014  Goel et al.
2014/0376376 A1*  12/2014  Bejerano ............... H04L 47/263
                                                  370/235

* cited by examiner

FEEDBACK MECHANISM FOR MULTICAST PROTOCOLS

CROSS-REFERENCE TO RELATED APPLICATIONS

The present application claims priority to GB Patent Application No. 1607582.2 filed 29 Apr. 2016, the entire content of which is hereby incorporated by reference.

FIELD OF THE INVENTION

The present techniques generally relate to methods, apparatus and systems for multicasting, and in particular to optimising a multicasting protocol for a communication network.

BACKGROUND

There are ever increasing numbers of devices within the home, office buildings or the outdoor environment that have processing and communication capabilities which allow such devices to interact with other processing devices and cloud services. Everyday objects and relatively small scale processing devices may be connected to each other and to central platforms as part of the "Internet of Things" (IoT). For example, a heating system in the home may gather information from various temperature sensors and control the activation of heaters based on the gathered information; a factory pollution monitoring sensor may gather information from various chemical sensors and arrange maintenance based on the gathered information; whilst a healthcare provider may use wireless sensors, such as a heart rate monitor to track the health of patients while they are at home. In the cases described above the data is generally forwarded to a cloud service on the internet, using machine-to-machine (M2M) communication techniques.

In IoT, or in a typical M2M communication network, devices (or nodes) communicate with other devices within the network using a routing scheme. Routing schemes such as broadcasting and multicasting may enable one-to-many or many-to-many distribution which enables data to be sent to multiple devices simultaneously. However, devices in these networks may tend to have low processing power and small memory or small data storage capacity. The devices may lack user interfaces because, for example, of the cost of having a user interface such as a display, or because a display consumes too much power, or because of the physical size of the device itself making it difficult to provide a user interface. The devices may need to be configured in order to connect to the IoT or to other devices/services, but may lack, or have reduced capabilities for, configuration directly on the device. The device may not, for example, have the capability to feedback specific problems in the routing scheme used in the network.

SUMMARY

Techniques for enabling the provision of feedback on a multicasting protocol are described.

According to a first aspect of the present technique there is provided an apparatus comprising: a data store to store at least one variable parameter associated with a multicasting operation; a communication module to: multicast a data packet to a plurality of nodes in a communication network using the stored variable parameter; and receive, from a node of the plurality of nodes, a retransmitted version of the multicast data packet, the retransmitted data packet comprising feedback data; and at least one processor coupled to the data store and the communication module to: determine, using the feedback data, that the variable parameter requires modification to optimise the multicasting operation for the network; modify the variable parameter in response to the feedback data; and store the modified variable parameter in the data store.

According to a second aspect of the present technique there is provided an apparatus for retransmitting data packets, the apparatus comprising: at least one processor; and a communication module, coupled to the at least one processor, to: receive a first multicast data packet from a source apparatus in a communication network; modify the first multicast data packet by adding feedback data to the first multicast data packet, the feedback data specifying that at least one variable parameter associated with a multicasting operation used to send the first multicast data packet requires modification to optimise the multicasting operation for the network; and retransmit the modified first multicast data packet.

According to a third aspect of the present technique there is provided a communication network comprising: a source device comprising a data store to store at least one variable parameter associated with a multicasting operation, at least one processor, and a communication module coupled to the memory and the processor to: multicast a data packet to a plurality of node devices in the network using the stored variable parameter; and a node device comprising at least one processor, and a communication module coupled to the at least one processor to: receive the data packet from the source apparatus modify the data packet by adding feedback data to the data packet, the feedback data specifying that at least one variable parameter of the multicasting operation used to send the data packet requires modification to optimise the multicasting operation for the network; and retransmit the modified data packet; and wherein the source device communication module: receives, from the node device the modified data packet; determines, using the feedback data, that at least one variable parameter requires modification to optimise the multicasting operation for the network; modifies the variable parameter in response to the feedback data; and stores the modified variable parameter in the data store.

According to a fourth aspect of the present technique, there is provided a method of optimising operation, the method comprising: multicasting a data packet to a plurality of nodes in a communication network using a multicasting operation and at least one variable parameter associated with the multicasting operation; receiving, from a node of the plurality of nodes, a retransmitted version of the multicast data packet, the retransmitted data packet comprising feedback data; determining, using the feedback data, that the variable parameter requires modification to optimise the multicasting operation for the network; modifying the variable parameter in response to the feedback data; and storing the modified variable parameter.

According to a fifth aspect of the present technique, there is provided an apparatus comprising means for storing at least one variable parameter associated with a multicasting operation; means for multicasting a data packet to a plurality of nodes in a communication network using the stored variable parameter; means for receiving, from a node of the plurality of nodes, a retransmitted version of the multicast data packet, the retransmitted data packet comprising feedback data; and means for determining, using the feedback data, that the variable parameter requires modification to optimise the multicasting operation for the network, and for modifying the variable parameter in response to the feedback data As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

BRIEF DESCRIPTION OF THE DRAWINGS

The techniques are diagrammatically illustrated, by way of example, in the accompanying drawings, in which.

DETAILED DESCRIPTION

Broadly speaking, embodiments of the present technique provide apparatus, systems and methods to optimise a multicasting operation used to transmit data packets in a communication network.

The term "data packet" is used interchangeably herein with the terms "message", and "packet". The term "source apparatus" is used interchangeably herein with the terms "apparatus", "source device", "source", "sender", "sender device", "root device", "transmitter", "transmitter apparatus", and "transmitting device". The term "node apparatus" is used interchangeably herein with the terms "apparatus", "node", "node device", "constrained node", "unconstrained node", "less constrained node", "forwarding device", "receiver", "receiver apparatus", and "receiving device". The term "communication network" used herein generally means a computer network or data network formed of multiple computing devices where data is exchanged between the devices. The communication network may be a mesh network, a wireless mesh network, or a constrained/low-power wireless network.

Figure 1:
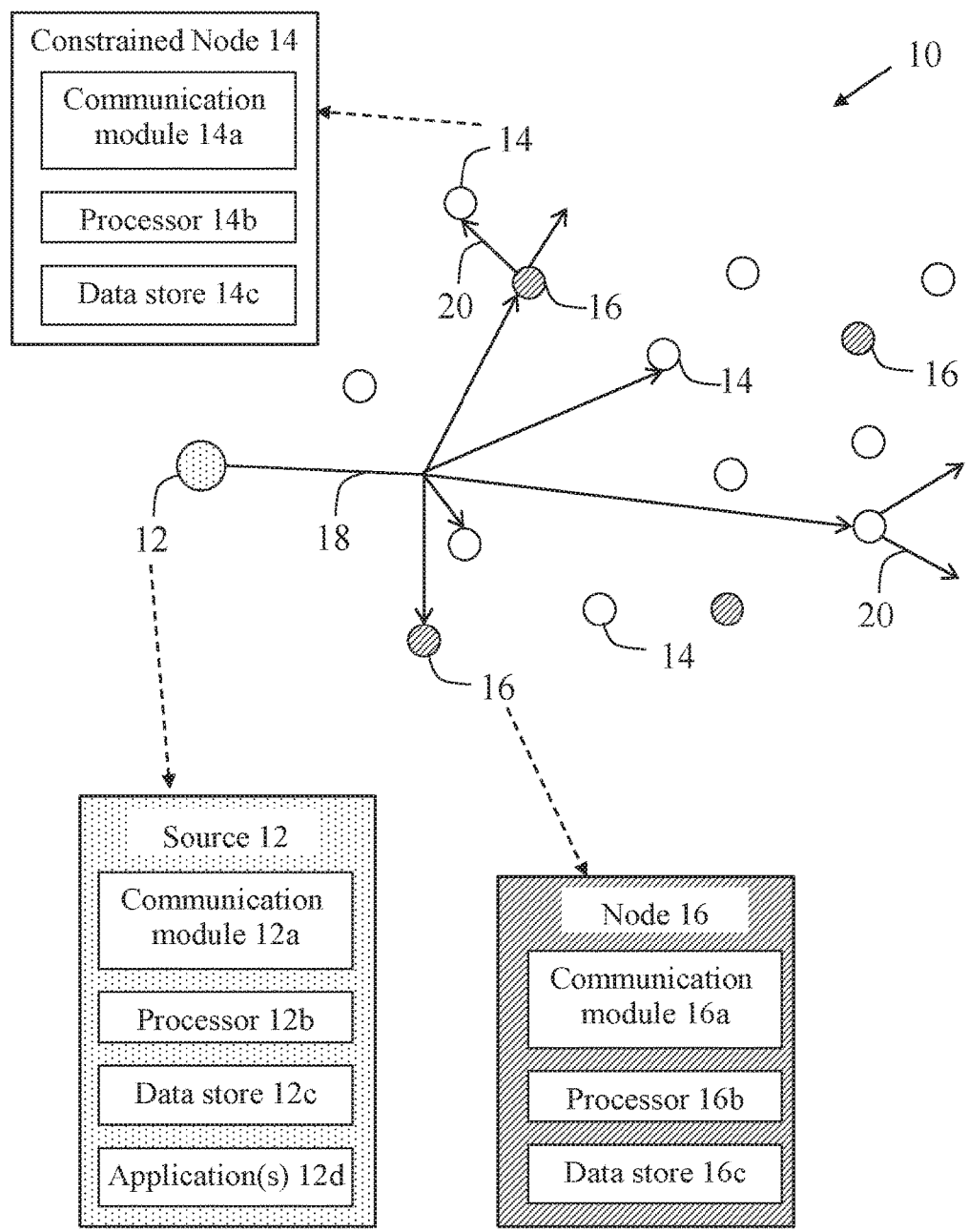
FIG. 1 shows a schematic diagram of a communication network.

FIG. 1 shows a schematic diagram of a communication network 10, which may be a mesh network or a wireless mesh network. The communication network 10 may a low-power and lossy network (LLN), which may operate with strict resource constraints in one or more of: communication, computation, memory, data storage and energy. The communication network 10 comprises at least one source device 12. In embodiments, the communication network 10 may comprise multiple source devices 12. The source device 12 uses at least a multicasting operation to communicate data to one or more nodes within the network 10, and optionally may use further communication schemes (such as unicasting, broadcasting and anycasting). A multicasting protocol may define at least part of the multicasting operation used by the source device 12 to communicate data to the nodes. At least one variable parameter is associated with the multicasting operation. The variable parameter may be a parameter defined by the multicasting protocol, and/or may be a parameter which is associated with the multicasting operation implemented by the source device 12 but which is not defined by the multicasting protocol. The multicasting operation performed by the source device 12 (and any other devices in the network 10) may be at least partially based upon the Multicast Protocol for Low-Power and Lossy Networks (MPL), which provides IPv6 multicast forwarding in constrained networks.

The, or each, source device 12 comprises a communication module 12a to transmit and receive data packets or data signals, using at least a multicasting protocol to transmit data packets. The communication module 12a may be any communication module suitable for transmitting and receiving data packets, or may be a communication module configured to (or adapted to) multicast data packets. The communication module 12a may be able to (or configured to): multicast a data packet to a plurality of nodes in a communication network using a multicasting operation and at least one variable parameter associated with the multicasting operation and stored in source device 12; and receive, from a node of the plurality of nodes, a retransmitted version of the multicast data packet, the retransmitted data packet comprising feedback data.

The communication module 12a is coupled to a processor 12b and a data store 12c. The processor 12b may comprise processing logic to process data (e.g. data signals and data packets received from other devices within the network 10, or from an external network) and generate output data in response to the processing. The processor 12b may comprise one or more of: a microprocessor, a microcontroller, and an integrated circuit. The processor 12b may be coupled to the data store 12c. The data store 12c may comprise a volatile memory, such as random access memory (RAM), for use as temporary memory, and/or non-volatile memory such as Flash, read only memory (ROM), or electrically erasable programmable ROM (EEPROM), for storing data, programs, or instructions. The source data store 12c may store at least one variable parameter associated with a multicasting operation performable by the source 12. In embodiments, data store 12c may store a multicasting protocol (or multicasting protocol settings) which defines at least part of the multicasting operation. The at least one variable parameter is used by the communication module 12a to transmit data packets to nodes in the network using a multicasting operation. In preferred embodiments, the data store 12c may be able to store (or configured to, or adapted to, store) at least one variable parameter associated with a multicasting operation. As explained in more detail below, the variable parameter may be a multicasting protocol parameter, or may be a parameter which is associated with the multicasting operation implemented by the communication module 12a but is not defined by the multicasting protocol.

The processor 12b may be able to (or configured to, or adapted to): determine, using the feedback data, that the variable parameter requires modification to optimise the multicasting operation for the network; modify the variable parameter in response to the feedback data; and store the modified variable parameter in the data store 12c. Additionally or alternatively, the communication module 12a (or a combination of the communication module 12a and the processor 12b) may be able to (or configured to or adapted to) perform some or all of these actions. The communication module 12a may utilise the processor 12b to perform some or all of these actions, or may have its own internal processor (not shown) to perform some or all of these actions.

The communication network 10 comprises a plurality of nodes, and may include at least one constrained node 14, and/or at least one unconstrained node 16. A constrained node 14 may have limited memory/data storage and processing capabilities, may sleep much of the time, and may operate using a constrained network technology. A constrained node 14 may be able to (or configured to) receive multicast data packets (e.g. data packets that have been sent from the source device 12 via a multicasting operation), and may be configured to forward the data packet to other nodes in the network 10, thereby distributing the data packet across the network 10. Each constrained node 14 comprises a communication module 14a able to (or configured to) receive data packets and transmit (or retransmit) the data packets to other nodes in the network 10. In particular, the communication module 14a may be able to (or configured to) receive multicast data packets (e.g. data packets sent from the source device), and retransmit the received multicast data packets to other nodes in the network. The communication module 14a may be able to (or configured to) receive retransmitted multicast data packets (e.g. from other node devices) and to retransmit the received retransmitted data packets. In embodiments, to avoid flooding the network 10 by retransmitting the same data packet multiple times, the communication module 14a may be only retransmit a data packet if it has been received from the source device 12, and/or if it the data packet is received via a multicasting protocol. In such embodiments, the node 14 may not retransmit data packets received from other nodes. Additionally, or alternatively, the node 14 may be configured to check if it has already retransmitted a received data packet, and if so, may discard the data packet to avoid duplicated transmission.

In embodiments, the network 10 may be a low-power and lossy network (LLN), and the source device 12 may be configured to use a multicasting operation which is at least partially defined by a multicasting protocol for low-power and lossy networks (e.g. the MPL protocol). In such embodiments, source device 12 may generate data packets that comply with the multicasting protocol and transmit the data packets to one or more nodes 14, 16 in the network that are configured to receive multicast data packets. For example, a constrained node 14 may be a device that implements MPL, and may have an MPL interface which enables node 14 to receive and transmit data packets that comply with the MPL protocol. The constrained node 14 may be considered a router that implements MPL, and may be referred to herein as an "MPL forwarder", "forwarder" or "forwarding device".

The communication module 14a of each node 14 may use any suitable communication technique to retransmit received data packets, such as multicasting, broadcasting or unicasting. In embodiments where the node 14 is an MPL forwarder, the node 14 may use at least the MPL protocol to retransmit (forward) received data packets. The communication module 14a is coupled to a processor 14b and a data store 14c. The processor 14b may comprise processing logic to process data (e.g. data packets received from other devices within the network 10) and generate output data in response to the processing. The processor 14b may comprise one or more of: a microprocessor, a microcontroller, and an integrated circuit. The processor 14b may be coupled to the data store 14c. The data store 14c may comprise a volatile memory, such as random access memory (RAM), for use as temporary memory, and/or non-volatile memory such as Flash, read only memory (ROM), or electrically erasable programmable ROM (EEPROM), for storing data, programs, or instructions. The data store 14c may store at least one communication protocol, or configuration settings for a communication process, used to retransmit (i.e. forward) data packets received by the communication module 14a. Depending on the communication protocol used by the node 14 to retransmit data packets, the data store 14c may store the address of the or each node the retransmitted data packet is to be sent to.

A node 16 (also referred to herein as a "less constrained node" or "unconstrained node") is substantially similar to constrained node 14, except that the node 16 may comprise more memory, data storage and/or processing capabilities relative to a constrained node 14. As explained in more detail below, a constrained node 14 may be able to provide limited feedback data on the multicasting operation employed by source 12. For example, a constrained node 14 may simply be able to indicate that the multicasting protocol is not optimal, while an unconstrained node 16 may be able to specify the aspect(s) of the multicasting operation that should be modified to optimise the communication. Accordingly, node 16 comprises a communication module 16a able to (or configured to) receive data packets and transmit (or retransmit) the data packets to other nodes in the network 10, which has substantially the same functionality as communication module 14a described above. The communication module 16a is coupled to a processor 16b and a data store 16c, which have substantially the same functionality as processor 14b and data store 14c respectively.

In embodiments where the network 10 is a low-power and lossy network (LLN), the source device 12 may use a multicasting operation based on the MPL protocol to transmit data packets to node 16. In this case, node 16 may be a device that implements MPL, and may have an MPL interface which enables node 16 to receive and transmit data packets that comply with the MPL protocol. The constrained node 16 may be considered a router that implements MPL, and may be referred to herein as an "MPL forwarder", "forwarder" or "forwarding device".

As shown in FIG. 1, source device 12 uses a multicasting operation (indicated by the arrow 18) to transmit data packets to multiple constrained nodes 14 and nodes 16. A constrained node 14 or node 16 which receives a multicast data packet from the source device 12 may be able to (or configured to) retransmit the data packet to other nodes in the network 10 (as shown by arrow 20). The retransmitted multicast data packet may be sent by node 14 or node 16 to one or more nodes in the network 10, including nodes which received the multicast data packet directly from source device 12. In this way, nodes 14/16 forward received multicast data packets across the network 10. The nodes 14/16 may use a multicasting operation (which may incorporate the MPL protocol, for example) to retransmit received data packets to other nodes in network 10. However, in conventional communication networks which distribute data packets in this way, there is no simple mechanism to indicate to the source device 12 that it is flooding the network 10 with too much data, or to provide any other feedback on the multicasting operation used by the source device 12. The term "flooding" is used to mean that the rate of data packet transmission used in the multicasting operation is too high, such that at least one node in the network 10 is unable to receive data packets at the rate of transmission, and/or such that a node is unable to forward a multicast data packet before it receives a further multicast data packet from the source 12. A constrained node 14 (or node 16) could send a unicast data packet to source 12 to request that the source turn down the transmission rate. However, if multiple nodes sent feedback to the source 12 in this way, the network would flood even further.

In the present techniques, a node 14 (or node 16) utilises the retransmission of a multicast data packet to provide feedback to the source 12. Accordingly, no new data packets may be required to send feedback on the multicasting operation to source 12. Instead, modified versions of existing (i.e. received) data packets are used to send feedback when the node 14/16 retransmits the data packet to other nodes in the network 10. Thus, by retransmitting a multicast data packet, a node 14/16 may both distribute data packets across the network 10 and provide feedback to the source device 12. The retransmitted multicast data packet containing feedback would eventually reach the source device 12, since most or all of the nodes in the network 10 are able to (or configured to) retransmit multicast data packets.

Multicasting protocols typically define some parameters that specify how the multicasting protocol is to be implemented. For example, a multicasting protocol (such as the MPL protocol) may define one or more of the following parameters: minimum retransmission interval, maximum retransmission interval, and number of timer expirations (i.e. number of retransmissions). Thus, nodes 14/16 which forward data packets using a multicasting operation may use the same multicasting operation as the source 12 which transmits the data packet to the network 10. The source 12 may be considered the 'root device', and the multicasting operation performed by the source 12 may incorporate a specific multicasting protocol and specific multicasting protocol parameters. The multicasting operation used by the source 12 may comprise one or more additional variable parameters, which are not defined by the multicasting protocol. The multicasting protocol parameters and/or the additional parameters may be changed on the root device 12 and the nodes 14/16 which use multicasting, in order to adapt the multicasting operation to suit properties of (and/or properties of components of) the network 10. As explained below, this may enable the multicasting operation to be adapted to suit (i.e. optimised for) each communication network. The parameters of the multicasting operation may differ between communication networks as a result, because each communication network may have different properties. (For example, the number of nodes, and the constraints in a network, and the ratio of constrained nodes to unconstrained nodes, may affect how a multicasting operation is implemented in the network, as these example factors may limit the multicasting rate and/or the multicasting data packet size, etc).

The multicasting operation performed by root device 12 may be at least partially based on a multicasting protocol, and the multicasting protocol may define one or more variable parameters of the multicasting operation. Some of these multicasting protocol parameters may be adjustable, for example, in response to feedback received from a node within network 10. Adjustable parameters may be adjusted by the root device 12, or by a software application/program which implements a multicasting protocol on root device 12, or by a higher authority device or higher level protocol. Some parameters which relate to the transmission of data packets by root device 12 may not be part of the multicasting protocol. For example, it may be required to reduce the size of data packets transmitted by root device to network 10, or to increase the minimum transmission interval between data packets sent by the root device. The parameters which specify data packet size, minimum transmission interval, and so on, may not be part of the multicasting protocol and therefore, may not be adjustable by the software application/program which implements a multicasting protocol on root device 12.

In embodiments, the root device 12 comprises at least one software application 12d or program which may be able to control/adjust one or more of the parameters associated with the multicasting operation at the root device 12. The application 12d may run using the processor 12b, and may be able to (or configured to) control how and when the root device 12 sends a data packet to the network 10 using a multicasting process. The application 12d may be able to adjust one or more parameters based on feedback received from a node in network 10.

In additional or alternative embodiments, the root device 12 may comprise multiple applications 12d. For example, a first application may implement a multicasting operation on root device 12, and a second application may control the first application and adjust parameters associated with the multicasting operation in response to feedback received from a node in network 10. This arrangement may be useful in embodiments where the first application cannot itself make some or all of the required parameter adjustments, or when the parameters that need to be adjusted are not defined in the multicasting protocol. The second application may be configured to adjust the required parameters itself. Alternatively, the second application may be configured to determine when the first application is preparing to transmit a data packet using the multicasting protocol, check the parameters being used by the first application and any feedback, and adjust parameters associated with the transmission before permitting the first application to transmit the data packet. For example, the multicasting protocol itself may not specify a maximum data packet size, but feedback may have been received by root device 12 which indicates that the size of the data packets that the root device multicasts may need to be reduced. Thus, the second application may intervene when the first application is preparing to transmit a data packet to, for example, check the data packet size of the data packet. If the second application determines the data packet size is too large (based on the received feedback), then the second application may prompt the first application to reduce the data packet size before transmission. The first application may, in response, split the data packet into multiple smaller data packets. Similarly, the second application may require the first application to delay the transmission of a data packet if, for example, feedback indicates that the minimum interval between sending new data packets may need to be increased.

In embodiments, adjustments to a parameter that is defined by the multicasting protocol (e.g. minimum retransmission interval), or associated with the multicasting operation (but not defined by the protocol, e.g. maximum data packet size, minimum interval between sending data packets, etc.), may be implemented at a multicast protocol level, or by some other protocol/logic between the multicast protocol level and the application level.

In embodiments, any adjustments to a multicasting protocol parameter, and/or adjustments to a parameter associated with the multicasting operation may be communicated to each forwarding device (node 14/16) in network 10, so that each forwarding device may also use the same parameters. The root device 12 may send the new, adjusted parameter(s) to forwarding devices via a dedicated multicast or unicast data packet. Alternatively, the root device may send the new, adjusted parameter(s) to the forwarding devices inside the header of a multicast data packet the next time the root device is multicasting a data packet to network 10.

To provide feedback, the node 14/node 16 may perform any one or more of: setting a flag in a header of the multicast data packet, modifying a reserved field in the header of the multicast data packet, adding a new header to the multicast data packet, and modifying at least one bit of a field in the header of the multicast data packet. Thus, the node 14/node 16 does not change the content or data section of the multicast data packet, but instead modified a header section of the multicast data packet to provide feedback data. The memory, data storage and/or processing capabilities of the node may affect the time of action the node takes to provide feedback. For example, a constrained node 14 may be able to make relatively simple modifications of the header section in order to provide feedback, e.g. setting a flag or modifying a bit in a field of the header. The flag which may be set, or the bit which may be modified, may be pre-defined or reserved specifically for providing feedback, so that the node 14 knows how to provide feedback to the source device 12, and so that the source device 12 knows where to find the feedback data in a received data packet. There may be a single flag which can be set, such that setting the flag indicates a problem with the multicasting process, but may not indicate what the problem is. The source device 12 may then have to perform a series of modifications to determine the problem—this is explained in more detail with reference to FIG. 3 below. Alternatively, there may be more than one flag in the header section of a data packet which may be set, where each flag is indicative of a particular problem with the multicasting process, e.g. one flag for indicating the multicasting transmission rate is too high, another flag to indicate that the data packets sent via the multicasting protocol are too large, and so on. The constrained node 14 may be able to set one or more of these flags. Similarly, a single bit or multiple bits in the header section may be modifiable.

An unconstrained (or less-constrained) node 16 having more memory, data storage and/or processing power may be able perform the same basic modifications as the constrained node 14, and/or may be able to make other modifications to provide more specific feedback to the source device 12. For example, node 16 may be able to add a new header to the multicast data packet to provide feedback data, where the new header contains information on a specific problem with the multicasting process, and/or node 16 may be able to use additional reserved bits/flags in the header section to provide specific feedback.

In embodiments, if network 10 comprises one or more constrained nodes 14 and one or more unconstrained nodes 16, the feedback mechanism used by each node type (i.e. constrained and unconstrained) may be the same or generally appropriate for all node types. For example, if node 16 adds a new header or uses reserved bits/flags in the header section of a data packet to provide feedback, an unconstrained node 14 which receives this modified data packet from node 16 may not understand or be able to process the data packet. The additional feedback added by the unconstrained node may prevent constrained nodes from handling the data packet appropriately. Accordingly, the feedback mechanism used by node 16 may need to be appropriately selected so that data packets containing the feedback can be processed by constrained nodes 14. However, if the nodes 14 and nodes 16 which receive retransmitted data packets are able to handle/process data packets that comprise an additional header (or additional bits/flags, etc.), then unconstrained nodes 16 may be permitted to modify data packets in this way to provide specific feedback data.

In embodiments, the communication module 12a of source device 12 may multicast a data packet using a multi-hop multicast protocol, or via a direct multicast protocol.

In embodiments, the communication network 10 may be a wireless mesh network.

In embodiments, the feedback data in the received data packet by source device 12 may be least one of: a flag in a header of the data packet, a modified reserved field in a header of the data packet, a new header added to the data packet, a modified bit of a field in a header of the data packet. The feedback data in the received data packet may indicate any one or more of: an unspecific problem with the multicasting operation, a specific problem with the multicasting operation, multicasting transmission rate is high, data packet size is large, data packets are being fragmented, minimum retransmission interval is low, a minimum time delay between multicasting data packets needs to be increased, a suggested minimum time delay, a maximum data packet size needs to be decreased, and a suggested maximum data packet size. Thus, the feedback data could merely indicate that the multicasting operation is not optimal for the communication network, or could indicate a specific problem with one or more variable parameters associated with the multicasting operation, and may specify how a variable parameter could be modified to optimise the multicasting operation for the network.

In embodiments, the at least one variable parameter associated with the multicasting operation is a parameter defined by the multicasting protocol.

In embodiments, the communication module is able to (configured to): transmit a further data packet to a plurality of nodes in the network, the further data packet comprising the modified variable parameter and instructions to the nodes to use the modified variable parameter. The communication module may transmit the further data packet using one or more of: multicasting, unicasting, and broadcasting. In embodiments, the communication module may use multicasting to transmit the further data packet, wherein the modified variable parameter and instructions may be contained in a header of the multicast further data packet.

As explained in more detail with reference to FIG. 7 below, a mechanism may be provided to prevent any node which receives a retransmitted multicast data packet that contains feedback data from itself retransmitting the multicast data packet with the feedback data. This may be useful to prevent the source device 12 from receiving the same feedback multiple times. Similarly, a mechanism may be provided to prevent a source device 12 from acting upon multiple copies of a retransmitted multicast data packet, as explained with reference to FIG. 6 below.

Figure 2:
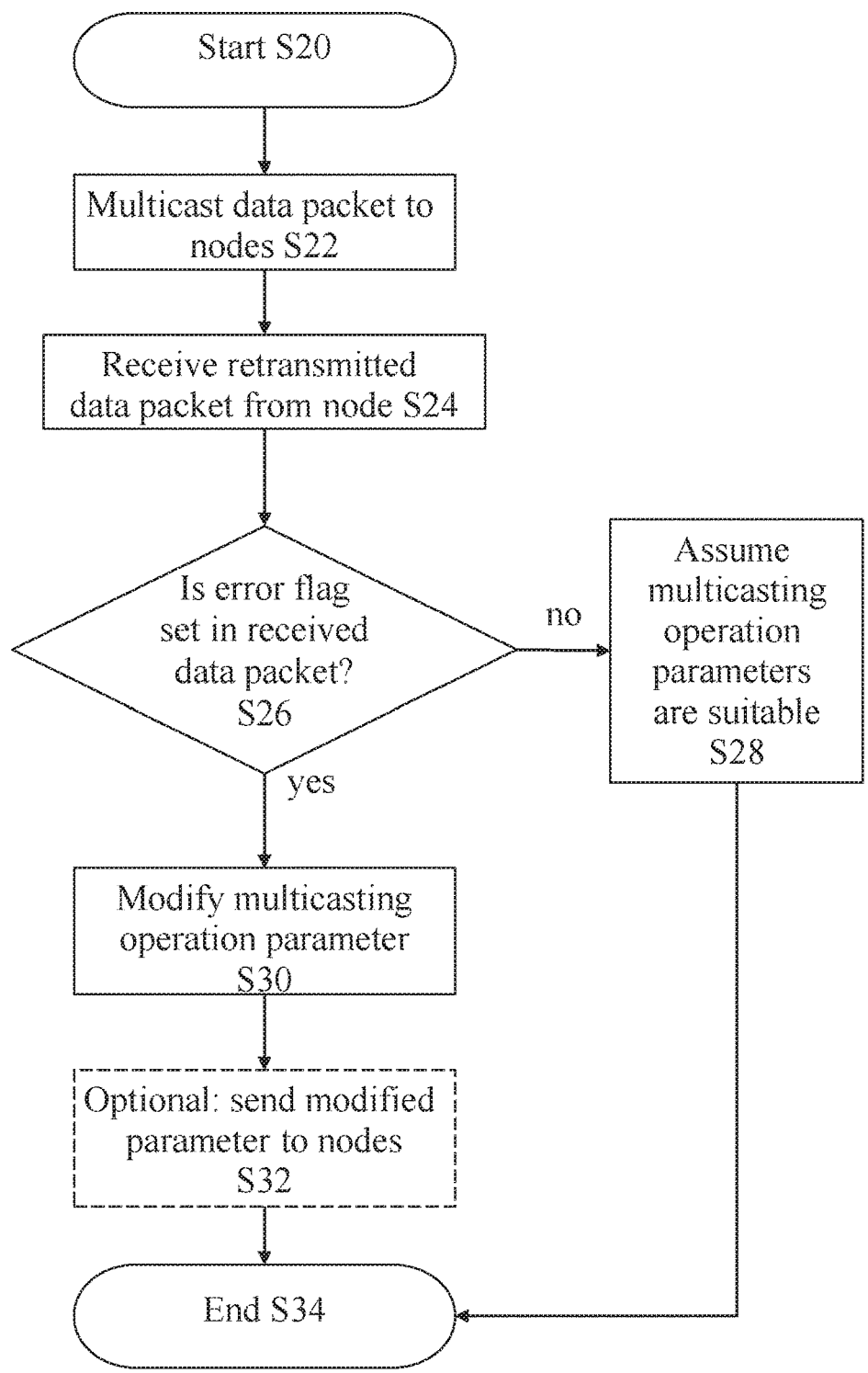
FIG. 2 shows a flow diagram of general steps to modify a multicasting operation in response to feedback data.

Turning now to FIG. 2, this shows a flow diagram of general steps performed by source device 12 to modify a multicasting operation in response to feedback data. The method begins at start step S20, and at step S22 the source device 12 uses the stored variable parameter(s) associated with a multicasting operation to multicast a data packet to several nodes in the network 10. In embodiments, source device 12 may be part of multiple communication networks 10, and the source device 12 may be able to use different multicasting operations to communication with each network. In such embodiments, the source device 12 may select a stored multicasting operation for a particular communication network and use the selected multicasting operation to transmit data packets to the nodes within the network. The source device 12 may use the same or a different multicasting operation to communicate with nodes in another communication network. The source device 12 may receive the same, or different, feedback from nodes within each communication network, such that the multicasting operation is optimisable by the source device 12 for each communication network.

In embodiments, the source device 12 may store a single multicasting operation for use with each communication network. After receiving feedback data from one or more of the communication networks, the source device 12 may be configured to add a modified version of the multicasting operation to data store 12c for use with a particular communication network. Additionally or alternatively, the source device 12 may be configured to add data to data store 12c indicating how at least one parameter associated with the multicasting process is to be modified for a particular communication network, such that the stored multicasting operation remains unmodified. In this case, the communication module 12a obtains this data from data store 12c prior to multicasting data packets to that particular communication network, and temporarily modifies the operation when multicasting.

Turning back to FIG. 2, at step S24, the source device 12 receives a retransmitted multicast data packet from a node in the network 10. The retransmitted multicast data packet is the data packet sent by the source device 12 at step S22 after it has been received by a node 14/node 16 and retransmitted by the node 14/16 to other nodes in the network 10. The retransmitted data packet received at step S24 may be received from the node 14/16 which originally received the multicast data packet at step S22, or may be received from any other node in the network 10 as explained earlier.

The processor 12b, and/or the communication module 12a, determine if feedback data is provided in the received retransmitted multicast data packet (step S26). This may involve checking, for example, whether a flag has been set, a bit has been changed, a new header has been added to the data packet, and so on. If no feedback data is identified within the received data packet, the processor 12b (and/or the communication module 12a) assumes that the multicasting operation parameters used at step S22 are suited to the communication network 10 (step S28), and the process ends at step S34. If feedback data is identified within the received data packet, the processor 12b (and/or the communication module 12a) modifies at least one of the variable parameters of the multicasting operation used at step S22 and stores either a modified version of the multicasting operation, a modified version of the variable parameter(s), or data indicating how the or each variable parameter is to be changed when the multicasting operation is next used (step S30). The process then ends at step S34.

In embodiments, the feedback data identified at step S26 may be unspecific, and may simply indicate that the multicasting operation is not optimal for network 10. In this case, the processor 12b may be able to (configured to) modify (at step S30) a particular variable parameter by default. For example, the processor 12b may modify the multicasting sending rate by default, by decreasing the sending rate. The amount by which the sending rate is decreased may be pre-determined, or may be selected by the processor 12b. In embodiments, the feedback data identified at step S26 may be specific and may indicate one or more variable parameters need to be modified, and the processor 12b modifies the indicated variable parameter(s) at step S30. In embodiments, the feedback data identified at step S26 may also comprise an indication of what the variable parameter(s) could be modified to. For example, a node 16 may know that it is capable of receiving multicast data packets of a particular size but that it cannot retransmit the multicast data packets because the size is too large for it to send, or because the size is too large to be received by other nodes in the network. Accordingly, the node 16 may provide an indication of a preferred data packet size in the feedback data, such that at step S30, the processor 12b modifies the variable parameter related to data packet size to the size indicated in the feedback data.

Optionally, any adjustments to a multicasting protocol parameter (e.g. minimum retransmission interval), and/or adjustments to a parameter associated with the multicasting operation (e.g. maximum data packet size, minimum interval between sending data packets, etc.) may be communicated to each node 14/16 which forwards (retransmits) data packets received from the source device 12. As explained above, each forwarding device (e.g. a node) may use the same parameters as the source device 12 when forwarding a received data packet to other nodes in the network 10. Thus, at step 32, source device 12 may send the modified parameter(s) to the nodes/forwarding devices either via a dedicated multicast or unicast data packet, or inside the header of a multicast data packet the next time the source device 12 multicasts a data packet to network 10.

Some of the steps performed by processor 12b may be performed by one or more applications 12d of source device 12 (in conjunction with processor 12b). For example, as explained above, an application 12d may be configured to adjust a parameter of, or associated with, the multicasting process.

Figure 3:
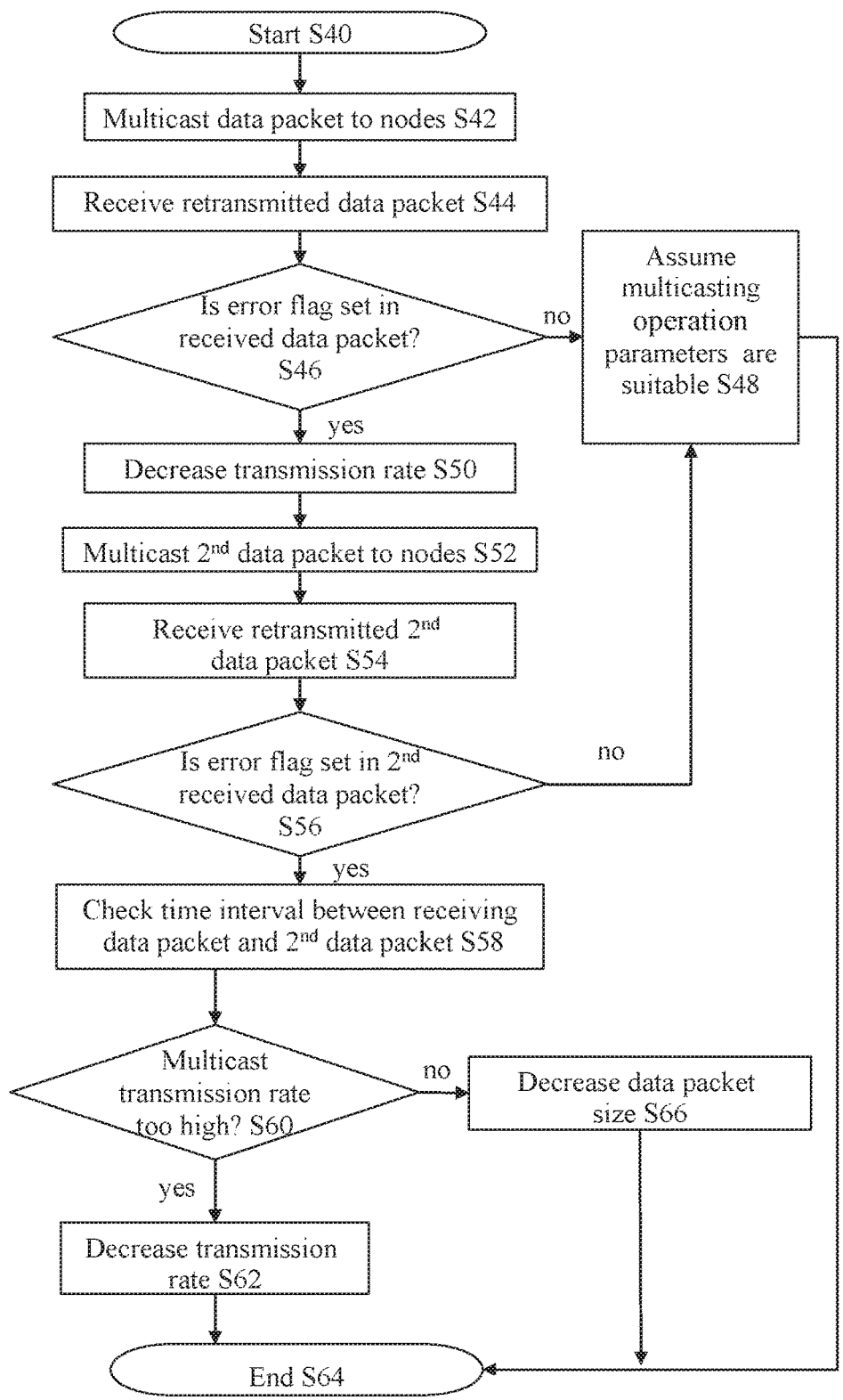
FIG. 3 shows a flow diagram of specific steps to modify a multicasting operation in response to feedback data.

FIG. 3 shows a flow diagram of specific steps performed by a source device 12 to modify a multicasting operation in response to unspecific feedback data, in a particular embodiment. Here, the feedback data merely indicates that the multicasting operation is not optimal for the communication network, but does not provide an indication of the or each variable parameter of the multicasting operation which should be modified.

The process begins at start step S40 and at step S42 the source device 12 uses the stored multicasting operation to multicast a data packet to several nodes in the network 10 (in a similar manner to that described above for FIG. 2). At step S44, the source device 12 receives a retransmitted multicast data packet from a node in the network 10. The retransmitted multicast data packet is the data packet sent by the source device 12 at step S42 after it has been received by a node 14/node 16 and retransmitted by the node 14/16 to other nodes in the network 10. The retransmitted data packet received at step S44 may be received from the node 14/16 which originally received the multicast data packet at step S42, or may be received from any other node in the network 10 as explained earlier.

The processor 12b, and/or the communication module 12a, determines if feedback data is provided in the received retransmitted multicast data packet (step S46). This may involve checking, for example, whether a flag has been set, a bit has been changed, a new header has been added to the data packet, and so on. If no feedback data is identified within the received data packet, the processor 12b assumes that the multicasting operation parameters used at step S42 are suited to/optimised for the communication network 10 (step S48), and the process ends at step S64.

If feedback data is identified within the received data packet, the processor 12b takes an action to modify one of the variable parameters of the multicasting operation. In the embodiment shown in FIG. 3, the feedback data is unspecific. Accordingly, by default, the processor 12b may modify the transmission rate of the multicasting operation by decreasing the transmission rate (step S50). This may be the default modification made by the processor 12b because it is likely that the transmission rate would need to be modified to suit the properties of the nodes in a particular communication network, and/or because it is a relatively simple modification to implement. In embodiments, a different variable may be modified by default.

The modified variable parameter (i.e. the transmission rate) is stored and/or the modified multicasting operation having a modified variable parameter is stored for use when the source device 12 next transmits data packets to the communication network 10. At step S52, the source device 12 uses the modified multicasting operation/modified variable parameter to multicast a second data packet to nodes in network 10.

As explained above, the processor 12b, one or more applications 12d, and/or a higher level protocol or higher level device may modify the variable parameter of the multicasting protocol (or a variable parameter associated with the multicasting operation).

Optionally, any adjustments to a multicasting protocol parameter (i.e. a parameter defined by the protocol) and/or adjustments to a parameter associated with the multicasting operation (i.e. a parameter not defined by the protocol but which may be used to adjust aspects of the multicasting process), may be communicated to each node 14/16 that is configured to forward (retransmit) data packets received from the source device 12. As explained above, each forwarding device (e.g. a node) may use the same parameters as the source device 12 when forwarding a received data packet via multicasting to other nodes in the network 10. Thus, optionally, source device 12 may send any modified parameter(s) to the nodes/forwarding devices either via a dedicated multicast or unicast data packet, or inside the header of a multicast data packet the next time the source device 12 multicasts a data packet to network 10.

At step S54, the source device 12 receives a retransmitted second multicast data packet from a node in the network 10. The processor 12b determines if feedback data is provided in the received retransmitted second multicast data packet (step S56). This may involve checking, for example, whether a flag has been set, a bit has been changed, a new header has been added to the data packet, and so on. If no feedback data is identified within the received second data packet, the processor 12b assumes that the modified multicasting operation parameter used at step S52 is suited to/optimised for the communication network 10 (step S48), and the process ends at step S64. If feedback data is identified within the received data packet at step S56, the processor 12b may then attempt to determine if the same variable parameter modified at step S50 (i.e. the transmission rate) may need to be modified further, or if a different variable parameter may need to be modified. For example, the processor 12b may check (as step S58) the time interval between receiving the retransmitted data packet and receiving the retransmitted second data packet. If the time interval is relatively short, the processor 12b may conclude that the nodes which received the multicast data packets (directly) from the source device 12 still do not find the transmission rate suitable. If the time interval is relatively long, the processor 12b may conclude that a different variable parameter may need to be altered. Additionally or alternatively, the processor 12b may check at step S58 the time interval between steps S42 and S44 and steps S52 and S54. If the time interval between steps S42 and S44 is substantially the same as the time interval between steps S52 and S54, the processor 12b may conclude that the transmission rate is unsuitable. In either case, the processor may then determine whether the multicast process transmission rate is still too high (step S60). If the transmission rate is too high (based on the analysis performed at step S58), the processor 12a may decrease the transmission rate further (step S62), and store either a further modified version of the multicasting operation, a further modified version of the variable parameter(s), or data indicating how variable parameter is to be changed when the multicasting operation is next used. The process then ends at step S62.

At step S60, the processor 12b may determine that the transmission rate is not too high. This may be in response to the analysis performed at step S58 and/or by determining that the transmission rate cannot be decreased any further (i.e. below a minimum transmission rate). In this case, the processor 12b takes an action to modify a different variable parameter at step S66, for example, decreasing the data packet size of data packets sent via the multicasting operation. (As explained above, the processor 12b, one or more applications 12d, and/or a higher level protocol or higher level device may modify the variable parameter at step S66. As above, the source device 12 may optionally send any modified parameter(s) to the nodes/forwarding devices either via a dedicated multicast or unicast data packet, or inside the header of a multicast data packet the next time the source device 12 multicasts a data packet to network 10). The process then ends at step S64. The skilled person would understand that the optimisation process could continue until no further feedback data is received by source device 12. This may involve further modifying the same variable parameters, and/or modifying other variable parameters.

In embodiments of the multicasting operation optimisation process, the processor 12a may be configured to overwrite the or each stored variable parameter with the corresponding modified variable parameter.

In embodiments where the at least one variable parameter comprises at least a first variable parameter and a second variable parameter, and where the feedback data received by the source device 12 is specific (i.e. it specifies which of the first variable parameter and the second variable parameter require modification), the processor 12a may be able to (or configured to): determine, using the feedback data, that one of the first variable parameter and the second variable parameter requires modification to optimise the multicasting operation for the network; and modify, responsive to the determining, the first variable parameter or the second variable parameter.

In embodiments where the at least one variable parameter comprises a first variable parameter and a second variable parameter, and wherein the feedback data does not specify which of the first variable parameter and the second variable parameter requires modification, the processor 12a is able to (or configured to): select the first variable parameter; and modify the first variable parameter to optimise the multicasting operation for the network. That is, the processor 12a simply selects one of the variable parameters and modifies the selected variable parameter. The variable parameter selected by the processor 12a may be a default parameter (i.e. a parameter that is modified by default if unspecific feedback is obtained), as mentioned earlier.

One of the variable parameters of the multicasting operation may specify a minimum time delay between multicasting data packets. In this case, the processor 12a may be able to (or configured to): modify the variable parameter to optimise the multicasting operation for the network by increasing the minimum time delay between multicasting data packets.

One of the variable parameters of the multicasting operation may specify a maximum data packet size that can be multicast. In this case, the processor 12a may be able to (or configured to): modify the variable parameter to optimise the multicasting operation for the network by decreasing the maximum data packet size that can be multicast.

The data store 12c of the source device 12 may be able to (or configured to) store a value specifying a maximum time delay (i.e. a minimum sending or transmission rate) between multicasting data packets. The maximum time delay (or minimum transmission rate) may be used to prevent the communication network from becoming inefficient, or from sending data packets too slowly. If the majority of node devices within a communication network are able to operate correctly at the minimum transmission rate (i.e. they are able to receive and retransmit data packets), but some node devices indicate the transmission rate is still too high, the source device 12 may be prevented from decreasing the transmission rate any further.

In embodiments, the at least one variable parameter may comprise a first variable parameter specifying a minimum time delay between multicasting data packets, and a second variable parameter specifying a maximum data packet size that can be multicast. In such embodiments, the communication module 12a may be able to (or configured to): multicast a first data packet to the plurality of nodes using the stored first variable parameter and the second variable parameter; receive, from a node, a retransmitted version of the first data packet, the retransmitted first data packet comprising first feedback data; multicast a second data packet to the plurality of nodes using the stored first variable parameter and the second variable parameter; and receive, from a node, a retransmitted version of the second data packet, the retransmitted second data packet comprising second feedback data. In response, the processor 12b and/or the communication module 12a may be able to (or configured to) optimise the multicasting operation by: determining if a time delay between multicasting the first data packet and multicasting the second data packet has reached the maximum time delay; and modifying, responsive to the determining, the first variable parameter to optimise the multicasting operation for the network if the first variable parameter has not reached (i.e. is not substantially equal to) the maximum time delay, by increasing the minimum time delay between multicasting data packets.

However, if the time delay between multicasting the first data packet and multicasting the second data packet has reached the maximum time delay, the processor 12a may be able to (or configured to): modify the second variable parameter to optimise the multicasting operation for the network by decreasing the maximum data packet size that can be multicast. For example, if the source device 12 continues to receive feedback from node devices, but cannot change the transmission rate any further, the source device 12 may modify a different variable parameter of the multicasting process.

In embodiments, in response to unspecific feedback, the source device 12 may continue to modify the first variable parameter until a minimum/maximum value is reached before modifying the second variable parameter. In other embodiments, the source device 12 may alternate between modifying the first variable parameter and the second variable parameter in response to unspecific feedback.

Figure 4:
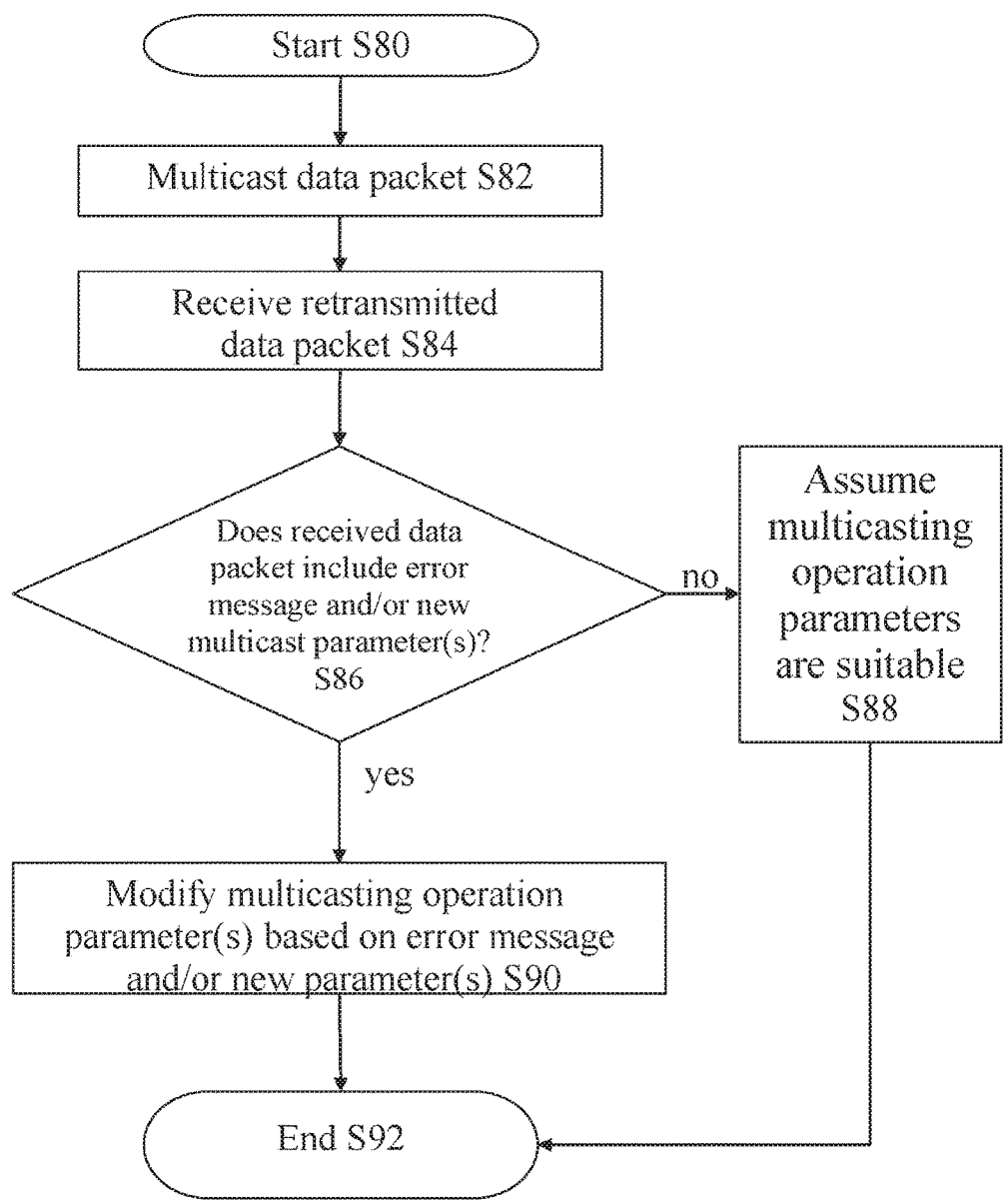
FIG. 4 shows a flow diagram of general steps to modify a multicasting operation in response to receiving an error message or a suggested parameter.

FIG. 4 shows a flow diagram of general steps performed by source device 12 to modify a multicasting operation in response to receiving specific feedback data or a suggested modification to a variable parameter of the multicasting operation. The process begins at start step S80 and at step S82 the source device 12 uses a multicasting operation and stored variable parameter(s) to multicast a data packet to several nodes in the network 10 (similar to the process shown in FIG. 2 and described above). At step S84, the source device 12 receives a retransmitted multicast data packet from a node in the network 10. The retransmitted multicast data packet is the data packet sent by the source device 12 at step S82 after it has been received by a node 14/node 16 and retransmitted by the node 14/16 to other nodes in the network 10. The retransmitted data packet received at step S84 may be received from the node 14/16 which originally received the multicast data packet at step S82, or may be received from any other node in the network 10 as explained earlier.

The processor 12b, and/or the communication module 12a, determines if feedback data is provided in the received retransmitted multicast data packet (step S86). In the embodiment shown in FIG. 4, the feedback data contained within the received retransmitted data packet at step S84 is specific, and may be provided within, for example, a new header that has been added to the data packet. If no feedback data is identified within the received data packet, the processor 12b assumes that the multicasting operation parameters used at step S82 are suited to the communication network 10 (step S88), and the process ends at step S92. If specific feedback data is identified within the received data packet at step S86, the processor 12b modifies at least one of the variable parameters of the multicasting operation used at step S82 in response to the feedback data (step S90). For example, the received retransmitted data packet may contain feedback data indicating which specific variable parameter requires modification, and/or may provide a suggested value for a specific variable parameter. Such specific feedback data may arrive from a node 16, which has the processing power and/or memory/data storage required to modify the data packet to include this feedback data. The processor 12b may store either a modified version of the multicasting operation, a modified version of the variable parameter(s), or data indicating how the or each variable parameter is to be changed when the multicasting operation is next used. The process then ends at step S92.

Figure 5:
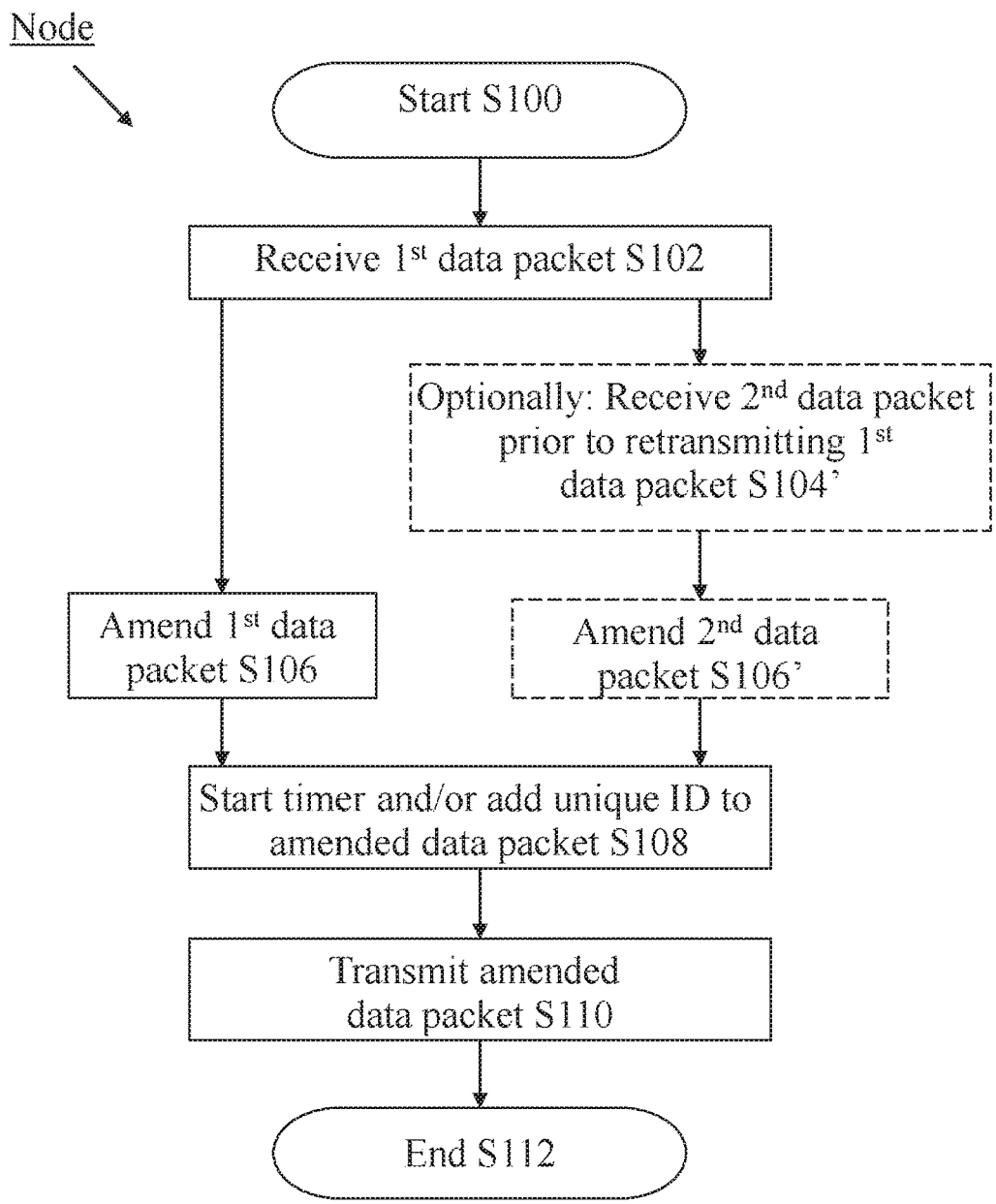
FIG. 5 shows a flow diagram of steps performed by a node device to provide feedback data on a multicasting process.

FIG. 5 shows a flow diagram of example steps performed by a node device (e.g. constrained node device 14, or node device 16) to provide feedback data on a multicasting operation to a source device 12. The example process starts at start step S100, and at step S102 the node device receives a first data packet. The first data packet may be a first multicast data packet received from the source device 12 via multicasting, or may be a retransmitted first multicast data packet received from another node device (which received the first multicast data packet from the source device 12 directly and then retransmitted the data packet).

In embodiments, at this stage, the node device may not need to send feedback data to the source device 12 because it has not yet encountered a problem. However, in other embodiments, the node device may have already encountered a problem and may wish to send feedback to the source device 12. Depending on whether or not the node device may need to send feedback at this stage (i.e. after receiving the first data packet), the process may proceed to step S106 (feedback required) or to step S104' (feedback not yet required).

The node device is configured to (automatically or otherwise) retransmit a data packet that it receives, such that data packets are distributed across a network 10. The data packets may be retransmitted using any communication protocol, including multicasting, broadcasting, unicasting, etc., and may therefore reach the source device 12 (which originally sent the data packet). The node device may also receive a data packet containing feedback data. Each node device could retransmit data packets containing feedback data without any modification to the data packet, and/or it could retransmit data packets after removing any feedback data from the data packet. The way in which a node device retransmits a data packet may depend on whether the node device has recently retransmitted a data packet containing the same feedback data. For example, if a node device identifies that the transmission rate of the multicasting operation used by the source device 12 is too high, the node device may add feedback data to this effect in the next received data packet that the node device retransmits. If the node device then receives a data packet containing the same feedback data, it may remove the feedback data before it retransmits the data packet to avoid providing the same feedback data multiple times in a certain period of time. However, if the node device receives a data packet containing different feedback data (e.g. specifying that the data packet size is too large), the node device may retransmit the data packet without modification as the node device has not communicated this feedback data yet. Thus, in preferred embodiments, the node device may be able to (or configured to) ignore duplicate feedback data, or to avoid sending feedback data multiple times within a certain time period.

In embodiments, the node device identifies a problem in the multicasting operation when it receives the first data packet, and wishes to send feedback to the source device 12. For example, if source device 12 sends a long (large) data packet, the data packet may be fragmented (i.e. broken into smaller data packets), so that the smaller, fragmented data packets may be readily transmitted in the network 10. The fragmentation may be performed by a network adaption layer protocol or a standard internet protocol, such as 6LoWPAN), if the maximum transmission unit in a network is smaller than the size of the data packet transmitted by the source device 12. Node devices (or other routing devices) in the network may be required to reassemble the original data packet from the smaller fragmented data packets to, for example, act upon or read the data contained within the data packet. However, the smaller fragmented data packets may become lost within the network 10, and are more likely to become lost than larger data packets. If a smaller fragmented data packet is lost, then a node device may not be able to reassemble the original data packet sent by the source device 12. In some cases, the node devices may run out of free memory (data storage space) to store the smaller fragmented data packets before it can reassemble a data packet. Thus, in embodiments, the node device may determine that the first data packet is a fragmented data packet (i.e. a fragment of a larger data packet), and the node device may wish to alert the source device 12 that the data packets being transmitted are being fragmented.

To provide this feedback, node device may modify the first data packet (at step S106) with feedback data. The node device modifies the first data packet with feedback data to indicate that one or more of the variable parameters of the multicasting operation are not optimised for the node device/network. For example, the node device may add feedback data to the first data packet indicating that data packets are being fragmented. As mentioned above, the node device may provide this feedback data in different ways, which may vary depending on whether the node device is a constrained node device or an unconstrained (or less constrained) node device.

In other embodiments, the node device may identify a problem in the multicasting operation after the node device has received a second data packet. In this case, the node device may begin retransmitting the received first data packet to other nodes in network 10. If at step S104', the node receives a second data packet before it has finished (or started) retransmitting the received first data packet, then at step S106' the node device modifies the second data packet with feedback data. The node may only have the processing power and/or memory/data storage to enable it to temporarily store one data packet for transmission at a time. Accordingly, if the node device receives a second data packet before it has transmitted (or finished transmitting) the first data packet, the first data packet may be automatically discarded or overwritten to store the second data packet. The node device may not have finished transmitting the first data packet because the multicasting transmission rate is too high, and/or because the size of the data packet it has to transmit is too large. The node device modifies the second data packet with feedback data to indicate that one or more of the variable parameters of the multicasting process are not optimised for the node device/network. As mentioned above, the node device may provide this feedback data in different ways, which may vary depending on whether the node device is a constrained node device or an unconstrained (or less constrained) node device.

In embodiments, the nodes may not be able to (or may be configured not to) retransmit the received first data packet when the node receives the second data packet before retransmission of the first data packet has begun or completed. This may be specified in the communication protocol used by the node to retransmit data packets (e.g. a multicasting protocol), or otherwise implemented in the node. Thus, in embodiments, even if the first data packet could be temporarily stored in a data store of the node, the node still does not retransmit the first data packet after receiving the second data packet. In this case, other devices which ordinarily receive retransmitted data packets from the node, may not receive the first data packet unless it receives the first data packet from other nodes in the system/network.

Thus, in embodiments, a node device may be able to (or configured to): receive a first multicast data packet from a source apparatus in a communication network; modify the first multicast data packet by adding feedback data to the first multicast data packet, the feedback data specifying that at least one variable parameter associated with a multicasting operation used to send the first multicast data packet requires modification to optimise the multicasting operation for the network; and retransmit the modified first multicast data packet.

In alternative embodiments, a node device may be able to (or configured to): receive a first multicast data packet from a source apparatus in the network; and receive a second multicast data packet from the source apparatus before retransmitting the received first multicast data packet; modify the second multicast data packet by adding feedback data to the second multicast data packet, the feedback data specifying that at least one variable parameter of a multicasting protocol used to send the first and second multicast data packets requires modification to optimise the multicasting operation for the network; and retransmit the modified second multicast data packet.

In embodiments, at least one variable parameter of the multicasting operation specifies a minimum time delay between multicasting data packets. The node device (or specifically a processor or communication module thereof) may be able to (or configured to): add feedback data to the second multicast data packet indicating that the minimum time delay needs to be increased to optimise the multicasting operation for the network. In such embodiments, the node device may be able to (or further configured to): add a suggested minimum time delay to the second multicast data packet. This may be possible if the node device is an unconstrained (or less-constrained node), which has the processing power to provide specific feedback, and potentially suggested values for a variable parameter which requires modification.

In embodiments, at least one variable parameter of the multicasting operation specifies a maximum data packet size that can be multicast. The node device (or specifically a processor or communication module thereof) may be able to (or configured to): add feedback data to the second multicast data packet indicating that the maximum data packet size needs to be decreased to optimise the multicasting operation for the network. In such embodiments, the node device may be able to (or further configured to): add a suggested maximum data packet size to the second multicast data packet. As above, this may be possible if the node device is an unconstrained (or less-constrained node), which has the processing power to provide specific feedback, and potentially suggested values for a variable parameter which requires modification.

The node device may add feedback data to the second multicast data packet by performing one or more of: setting a flag in a header of the second multicast data packet, modifying a reserved field in the header of the second multicast data packet, adding a new header to the second multicast data packet, and modifying at least one bit of a field in the header of the second multicast data packet.

As mentioned earlier, embodiments of the present techniques provide a mechanism to prevent any node which receives a data packet that contains feedback data from itself retransmitting the data packet with the feedback data. This may be useful to prevent the source device 12 from receiving the same feedback multiple times. Accordingly, at step S108, the node device may take an action to prevent itself from retransmitting a data packet with the same feedback data that has been added at step S106 or S106', or to reduce the chance of another node retransmitting the same feedback data multiple times.

In embodiments, the node device comprises a timer which activates (or switches on, or starts, or counts down) when the node device retransmits a modified second multicast data packet. Thus, the node device may start a timer or clock when it transmits a data packet containing feedback data (step S108). The timer may count down a pre-defined amount of time, e.g. a minute, several minutes, an hour, etc., and while the timer is counting down, the node device may not retransmit a data packet containing the same feedback data that it sent when the timer was initiated.

In embodiments, the node device may be able to (or configured to): receive a third (or further) multicast data packet; determine that at least one variable parameter of a multicasting protocol used to send the third (or further) multicast data packet requires modification; check if the timer has expired; modify, responsive to the check, the third (or further) multicast data packet by adding feedback data to the third (or further) multicast data packet if the timer has expired; and retransmit the modified third (or further) multicast data packet. In particular embodiments, if the timer has not expired, the node device may retransmit the third/further multicast data packet without modification (i.e. with the feedback data).

Additionally or alternatively, the node device may add a unique identifier (ID) to the second data packet together with the feedback data, where the ID identifies the node device which added the feedback data to the data packet. Thus, in embodiments, the node device may be able to (or configured to): add identification data to the second multicast data packet, the identification data identifying the apparatus which adds the feedback data. Other devices (e.g. node or source) within the network 10 which receive the retransmitted data packet containing the ID, may determine if they have already retransmitted a data packet containing the same feedback data and the same ID in a certain time period (e.g. in the last few minutes, the last hour, etc). If the device has already retransmitted a data packet containing the same feedback data and the same ID, the device may be discard the received data packet, or may be retransmit the received data packet without the feedback data.

Thus, in embodiments the node device may be able to (or configured to): receive a third (or further) multicast data packet; determine that at least one variable parameter of a multicasting protocol used to send the third (or further) multicast data packet requires modification; check if the third (or further) multicast data packet comprises identification data; modify, responsive to the check, the third (or further) multicast data packet by adding feedback data if the third (or further) multicast data packet does not comprise identification data; and retransmit the modified third (or further) multicast data packet. In particular embodiments, if the third (or further) multicast data packet comprises identification data, the node device is configured to retransmit the third (or further) multicast data packet without modification/without adding feedback data, as the identification data indicates feedback data has already been sent.

In FIG. 5, once the timer has been activated and/or the unique ID has been added to the amended second data packet, the node device transmits the amended second data packet S110. The process then ends at step S112.

Figure 6:
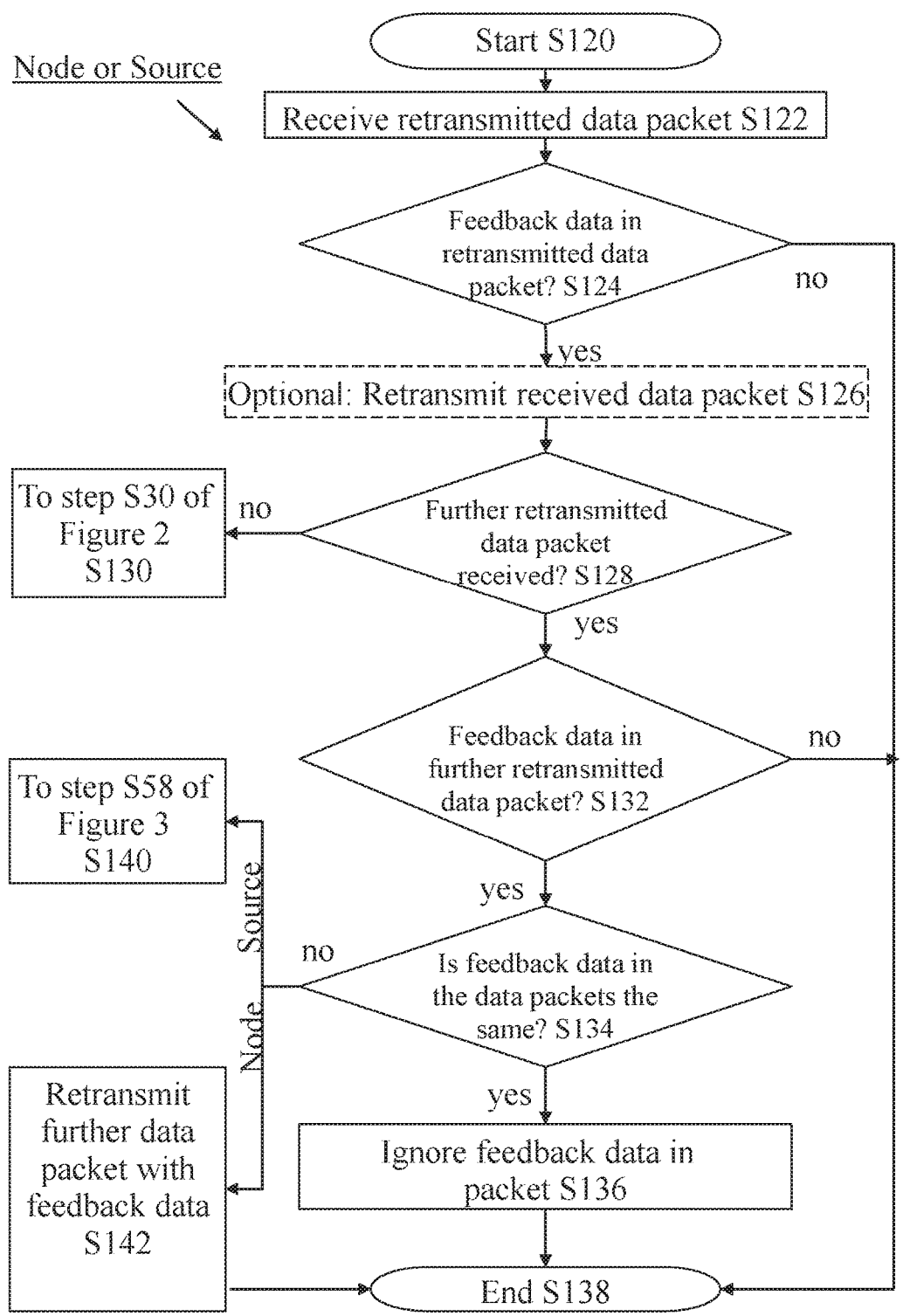
FIG. 6 shows a flow diagram of the steps performed by a node device or a source device when multiple feedback data is received.

FIG. 6 shows a flow diagram of the steps performed by a node device or a source device when multiple feedback data is received by the device. The process begins at step S120, and at step S122 the device (node or source) receives a retransmitted data packet S122. The device determines whether the retransmitted data packet contains feedback data (step S124). If no feedback data is identified, the process ends at step S138. If feedback data is identified, and if the device is a node device, the device may retransmit the received data packet with the feedback data (step S126). If the device is a source device, the device may act upon the feedback data (e.g. to change a variable parameter of the multicasting protocol). In embodiments, the device (node or source) may not immediately take any action and may wait for a short period of time before retransmitting the data packet/modifying a variable parameter.

Optionally, in the case of a source device 12, the source device may wait a short period of time after performing step S124 before acting upon the feedback data. If in this period of time the source device receives no further data packet from the network 10 (at step S128), the source device proceeds to step S30 of FIG. 2 (step S130), i.e. modifies one or more variable parameters of the multicasting operation in response to the feedback data. If in this period of time the source device does receive a further data packet, the process continues to step S132. In embodiments, the source device may act upon the received feedback data at step S126 and may not wait a period of time before doing so. In the case of a node device, the node device may automatically retransmit the data packet without waiting for further data packets to arrive, particularly if they node is a constrained node or less-constrained node with limited memory/data storage.

If at step S132, the device (node or source) checks whether the further retransmitted data packet received at step S128 contains feedback data (step S132). If no feedback data, the process ends at step S138. If feedback data is found in the further retransmitted data packet, the device checks whether the feedback data in the further retransmitted data packet is the same feedback data found at step S124 (step S134). If at step S134 the feedback data is the same, the device may ignore the feedback data in the further data packet (step S136). For example, if the device is a source device, the source device ignores the feedback data and does not further modify the same variable parameter(s) corresponding to the feedback data. If the device is a node device, the node device may remove the feedback data from the further data packet and then retransmit the data packet. The process then ends at step S138. However, if at step S134 the feedback data is different, a source device proceeds to step S58 of FIG. 3 (step S140), while a node device retransmits the further data packet without removing the feedback data (step S142).

In embodiments, the node device may start a timer at substantially the same time as retransmitting the data packet at step S126. In such embodiments, if the node device determines at step S134 that the feedback data is the same in both data packets, the node device may be configured to check whether the timer is still running or has expired. If the node device timer is still running, the node device retransmits the further data packet without the feedback data, as explained above. However, if the node device timer has expired, the node device may instead retransmit the further data packet with the feedback data. Thus, the action taken at step S136 may vary depending on whether the node has set a timer or not.

Figure 7:
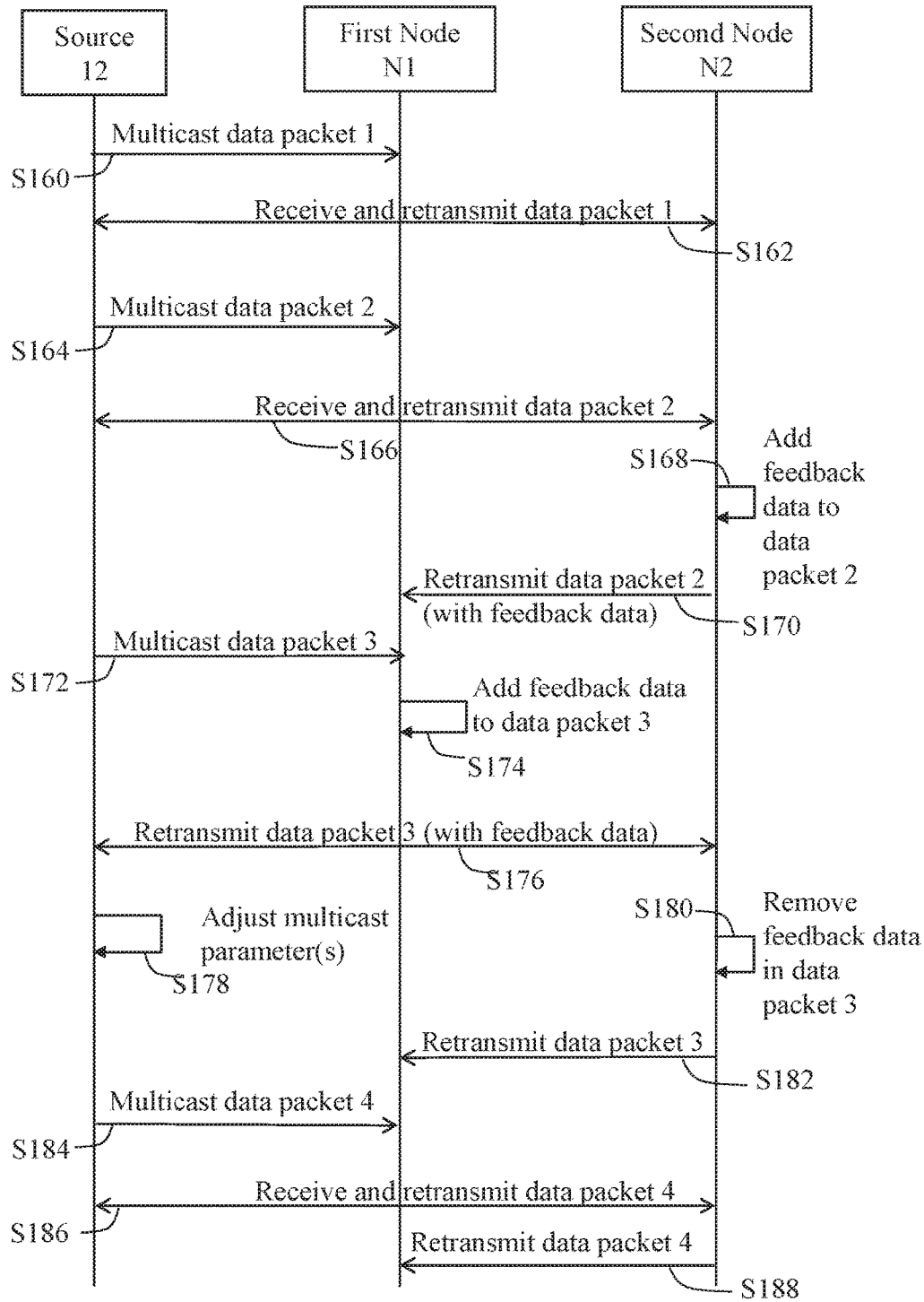
FIG. 7 shows a schematic diagram of the steps to modify a multicasting operation in response to feedback data.

FIG. 7 shows a schematic diagram of the steps to modify a multicasting operation in response to feedback data. Here, a source device 12 multicasts data packets to particular nodes in the network, including first node N1. First node N1 may be a constrained node 14, or an unconstrained (or less-constrained) node 16. The first node N1 is configured to retransmit received data packets to the source device 12 and to a second node N2. The second node N2 may be a constrained node 14, or an unconstrained (or less-constrained) node 16. Thus, the second node N2 may send feedback data back to source 12 via the first node N1. The first node N1 and the second node N2 may use any communication technique to transmit data packets, such as broadcasting, unicasting, and multicasting.

At step S160, the source 12 multicasts data packet 1 to first node N1. The source 12 uses a multicasting operation and stored variable parameter(s) associated with the multicasting operation to multicast data packet 1, as explained earlier. Both nodes N1 and N2 retransmit any received data packets to communicate the data packets across the network. Thus, first node N1 receives data packet 1 and retransmits data packet 1 (step S162). As shown by the double-headed arrow of step S162, the first node N1 may retransmit data packet 1 using a communication protocol which results in sending the data packet to both source 12 and second node N2 (e.g. via multicasting). The second node N2 may receive data packet 1 and begin retransmitting the data packet as required (not shown). However, in the illustrated embodiment, the source 12 multicasts data packet 2 (step S164) before second node N2 has retransmitted data packet 1. The first node N1 receives data packet 2 and retransmits data packet 2 (step S166). Thus, the second node N2 receives data packet 2 before it has retransmitted data packet 1. This may result in data packet 1 being discarded/deleted/overwritten, particularly if node N2 only has limited memory/data storage and may, for example, only be able to store a single data packet at a time. Thus, at step S168 the second node N2 adds feedback data to data packet 2, and then retransmits the modified data packet 2 (step S170). The feedback data may, for example, indicate that the transmission rate of the multicasting operation is too high. In the illustrated example, the second node N2 is configured to at least retransmit data packets to first node N1.

In embodiments, the nodes N1, N2 may be configured to not retransmit a first data packet if the node N1/N2 receives a second data packet before retransmission of the first data packet has begun or completed. This may be specified in the communication operation used by the node N1/N2 (e.g. a multicasting protocol), or otherwise implemented in the node N1/N2. Thus, in embodiments, even if the first data packet could be temporarily stored in a data store of the node N1/N2, the node still does not retransmit the first data packet if the second data packet is received. In this case, a node which ordinarily receives retransmitted data packets from node N1/N2, may not receive the first data packet unless it receives the first data packet from other nodes in the system/network.

The first node N1 is configured to retransmit the received modified data packet 2 to other devices, including source 12. However, before the first node N1 has retransmitted the modified data packet 2, the source 12 multicasts data packet 3 (step S172), such that first node N1 receives multicast data packet 3 before it has retransmitted modified data packet 2. Accordingly, source 12 has not yet received any feedback data and has therefore not modified the multicasting operation or associated variable parameter.

First node N1 adds feedback data to received data packet 3 (step S174) and retransmits modified data packet 3 (step S176) with the feedback data. The feedback data may indicate that the transmission rate of the multicasting operation is too high. Source device 12 receives the retransmitted modified data packet 3 and identifies the feedback data. The source device 12 adjusts one or more variable parameters of the multicasting operation in response to the feedback data (step S178), as described earlier.

Second node N2 also receives the retransmitted modified data packet 3 from node N1. As the second node N2 has recently sent a data packet with the same feedback data (in step S170), the second node N2 removes the feedback data in data packet 3 (step S180) and then retransmits data packet 3 (step S182). If, at step S168 or step S170 the second node N2 started a timer (as described above with respect to FIG. 5), at if the timer has expired when second node N2 receives data packet 3 from node N1, then second node N2 may retransmit data packet 3 without modification (i.e. with the feedback data). Additionally or alternatively, if the feedback data contained within data packet 3 is different to the feedback data added at step S170 to data packet 2, then the second node may, at step S180, retransmit data packet 3 without modification.

At step S184, source 12 multicasts data packet 4 using the modified variable parameter and/or modified multicasting operation. The first node N1 receives multicast data packet 4 from source 12 and retransmits data packet 4 (step S186). Second node N2 retransmits the received data packet 4, without adding feedback data second node N2 has no further feedback to provide (step S188), or with additional feedback data (not shown). In this way, a multicasting operation and associated parameters(s) used by source 12 may be optimised to suit some or all of the node devices within a network.

In an embodiment, there is provided an apparatus comprising: a data store to store at least one variable parameter associated with a multicasting operation; a communication module to: multicast a data packet to a plurality of nodes in a communication network using the stored variable parameter; and receive, from a node of the plurality of nodes, a retransmitted version of the multicast data packet, the retransmitted data packet comprising feedback data; and at least one processor coupled to the data store and the communication module to: determine, using the feedback data, that the variable parameter requires modification to optimise the multicasting operation for the network; modify the variable parameter in response to the feedback data; and store the modified variable parameter in the data store.

In embodiments, the processor overwrites the stored variable parameter with the modified variable parameter.

In embodiments, the variable parameter specifies a minimum time delay between multicasting data packets, and wherein the processor modifies the variable parameter, to optimise the multicasting operation, by increasing the minimum time delay between multicasting data packets.

In embodiments, the variable parameter specifies a maximum data packet size that can be multicast, and wherein the processor modifies the variable parameter, to optimise the multicasting operation, by decreasing the maximum data packet size that can be multicast.

In embodiments, the at least one variable parameter comprises a first variable parameter and a second variable parameter, and wherein the processor: determines, using the feedback data, that one of the first variable parameter and the second variable parameter requires modification to optimise the multicasting operation for the network; and modifies, responsive to the determining, the first variable parameter or the second variable parameter.

In embodiments, the at least one variable parameter comprises a first variable parameter and a second variable parameter, wherein the feedback data does not specify which of the first variable parameter and the second variable parameter requires modification, and wherein the processor: selects the first variable parameter; and modifies the first variable parameter to optimise the multicasting operation for the network.

In embodiments, the data store stores a value specifying a maximum time delay between multicasting data packets. The at least one variable parameter may comprise a first variable parameter specifying a minimum time delay between multicasting data packets, and a second variable parameter specifying a maximum data packet size that can be multicast; and wherein the communication module: multicasts a first data packet to the plurality of nodes using the stored first variable parameter and the second variable parameter; receives, from a node, a retransmitted version of the first data packet, the retransmitted first data packet comprising first feedback data; multicasts a second data packet to the plurality of nodes using the stored first variable parameter and second variable parameter; receives, from a node, a retransmitted version of the second data packet, the retransmitted second data packet comprising second feedback data; and wherein the processor optimises the multicasting operation by: determining if a time delay between multicasting the first data packet and multicasting the second data packet has reached the maximum time delay; and modifying, responsive to the determining, the first variable parameter to optimise the multicasting operation if the first variable parameter is not equal to the maximum time delay, by increasing the minimum time delay between multicasting data packets.

In embodiments, if the time delay between multicasting the first data packet and multicasting the second data packet has reached the maximum time delay, the processor modifies the second variable parameter, to optimise the multicasting operation, by decreasing the maximum data packet size that can be multicast.

In embodiments, the communication module is configured to multicast a data packet using multi-hop multicast.

In embodiments, the communication network is a wireless mesh network.

In embodiments, the feedback data in the received data packet is at least one of: a flag in a header of the data packet, a modified reserved field in a header of the data packet, a new header added to the data packet, a modified bit of a field in a header of the data packet.

In embodiments, the feedback data indicates any one or more of: an unspecific problem with the multicasting operation, a specific problem with the multicasting operation, multicasting transmission rate is high, data packet size is large, data packets are being fragmented, minimum retransmission interval is low, a minimum time delay between multicasting data packets needs to be increased, a suggested minimum time delay, a maximum data packet size needs to be decreased, and a suggested maximum data packet size.

In embodiments, the at least one variable parameter associated with the multicasting operation is a parameter defined by the multicasting protocol.

In embodiments, the communication module transmits a further data packet to a plurality of nodes in the network, the further data packet comprising the modified variable parameter and instructions to the nodes to use the modified variable parameter.

In embodiments, the communication module transmits the further data packet using one or more of: multicasting, unicasting, and broadcasting. Additionally or alternatively, the communication module uses multicasting to transmit the further data packet, and wherein the modified variable parameter and instructions are contained in a header of the multicast further data packet.

In an embodiment, there is provided an apparatus for retransmitting data packets, the apparatus comprising: at least one processor; and a communication module, coupled to the at least one processor, to: receive a first multicast data packet from a source apparatus in a communication network; modify the first multicast data packet by adding feedback data to the first multicast data packet, the feedback data specifying that at least one variable parameter associated with a multicasting operation used to send the first multicast data packet requires modification to optimise the multicasting operation for the network; and retransmit the modified first multicast data packet.

In embodiments, if the communication module receives a second multicast data packet from the source apparatus before retransmitting the received first multicast data packet, the communication module: modifies the second multicast data packet by adding feedback data to the second multicast data packet, the feedback data specifying that at least one variable parameter of the multicasting operation used to send the first and second multicast data packets requires modification to optimise the multicasting operation for the network; and retransmits the modified second multicast data packet.

In embodiments, the communication module retransmits the modified multicast data packet to one or more nodes by one or more of: multicasting, unicasting, and broadcasting.

In embodiments, the variable parameter of the multicasting operation is a minimum time delay between multicasting data packets, and wherein the communication module: adds feedback data to the multicast data packet indicating that the minimum time delay needs to be increased to optimise the multicasting operation for the network.

In embodiments, the communication module adds a suggested minimum time delay to the multicast data packet.

In embodiments, the variable parameter of the multicasting operation is a maximum data packet size that can be multicast, and wherein the communication module adds feedback data to the multicast data packet indicating that the maximum data packet size needs to be decreased to optimise the multicasting operation for the network.

In embodiments, the communication module adds a suggested maximum data packet size to the multicast data packet.

In embodiments, the communication module adds feedback data to the multicast data packet by performing one or more of: setting a flag in a header of the multicast data packet, modifying a reserved field in the header of the multicast data packet, adding a new header to the multicast data packet, and modifying at least one bit of a field in the header of the multicast data packet.

In embodiments, the communication module adds identification data to the multicast data packet, the identification data identifying the apparatus which adds the feedback data.

In embodiments, the communication module: receives a further multicast data packet; determines that at least one variable parameter of a multicasting operation used to send the further multicast data packet requires modification to optimise the multicasting operation for the network; checks if the further multicast data packet comprises identification data; modifies, responsive to the check, the further multicast data packet by adding feedback data if the further multicast data packet does not comprise identification data; and retransmits the modified further multicast data packet.

In embodiments, if the further multicast data packet comprises identification data, the communication module retransmits the further multicast data packet.

In embodiments, the apparatus further comprises a timer which activates when the communication module retransmits the modified multicast data packet.

In embodiments, the communication module: receives a further multicast data packet; determines that at least one variable parameter of a multicasting operation used to send the further multicast data packet requires modification to optimise the multicasting operation for the network; checks if the timer has expired; modifies, responsive to the check, the further multicast data packet by adding feedback data to the further multicast data packet if the timer has expired; and retransmits the modified further multicast data packet.

In embodiments, if the timer has not expired, the communication module retransmits the further multicast data packet.

In an embodiment, there is provided a communication network comprising: a source device comprising a data store to store at least one variable parameter associated with a multicasting operation, at least one processor, and a communication module coupled to the data store and the processor to: multicast a data packet to a plurality of node devices in the network using the stored variable parameter; and a node device comprising at least one processor, and a communication module coupled to the at least one processor to: receive the data packet from the source apparatus modify the data packet by adding feedback data to the data packet, the feedback data specifying that at least one variable parameter of the multicasting operation used to send the data packet requires modification to optimise the multicasting operation for the network; and retransmit the modified data packet; and wherein the source device communication module: receives, from the node device the modified data packet; determines, using the feedback data, that at least one variable parameter requires modification to optimise the multicasting operation for the network; modifies the variable parameter in response to the feedback data; and stores the modified variable parameter in the data store.

In an embodiment, there is provided a method of optimising a multicasting operation, the method comprising: multicasting a data packet to a plurality of nodes in a communication network using a multicasting operation and at least one variable parameter associated with the multicasting operation; receiving, from a node of the plurality of nodes, a retransmitted version of the multicast data packet, the retransmitted data packet comprising feedback data; determining, using the feedback data, that the variable parameter requires modification to optimise the multicasting operation for the network; modifying the variable parameter in response to the feedback data; and storing the modified variable parameter.

In an embodiment, there is provided an apparatus comprising: means for storing at least one variable parameter associated with a multicasting operation; means for multicasting a data packet to a plurality of nodes in a communication network using the stored variable parameter; means for receiving, from a node of the plurality of nodes, a retransmitted version of the multicast data packet, the retransmitted data packet comprising feedback data; and means for determining, using the feedback data, that the variable parameter requires modification to optimise the multicasting operation for the network, and for modifying the variable parameter in response to the feedback data.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier—such as a disk, microprocessor, CD- or DVD-ROM, programmed memory such as read-only memory (firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. An apparatus comprising:
   a data store to store at least one variable parameter associated with a multicasting operation;
   a communication transceiver to:
      multicast a data packet to a plurality of nodes in a communication network using the stored variable parameter; and
      receive, from a node of the plurality of nodes, a retransmitted version of the multicast data packet, the retransmitted data packet comprising feedback data; and
   at least one processor coupled to the data store and the communication transceiver to:
      determine, using the feedback data, that the variable parameter requires modification to optimise the multicasting operation for the network;
      modify the variable parameter in response to the feedback data; and
      store the modified variable parameter in the data store.

2. The apparatus as claimed in claim 1 wherein the processor is configured to overwrites the stored variable parameter with the modified variable parameter.

3. The apparatus as claimed in claim 1 wherein the variable parameter specifies a minimum time delay between multicasting data packets, and wherein the processor modifies the variable parameter, to optimise the multicasting operation, by increasing the minimum time delay between multicasting data packets.

4. The apparatus as claimed in claim 1 wherein the variable parameter specifies a maximum data packet size that can be multicast, and wherein the processor modifies the variable parameter, to optimise the multicasting operation, by decreasing the maximum data packet size that can be multicast.

5. The apparatus as claimed in claim 1 wherein:
   the data store is configured to store a value specifying a maximum time delay between multicasting data packets; and
   the at least one variable parameter comprises a first variable parameter specifying a minimum time delay between multicasting data packets, and a second variable parameter specifying a maximum data packet size that can be multicast; and
   wherein the communication transceiver is configured to:
      multicast a first data packet to the plurality of nodes using the stored first variable parameter and the second variable parameter;
      receive, from a node, a retransmitted version of the first data packet, the retransmitted first data packet comprising first feedback data;
      multicast a second data packet to the plurality of nodes using the stored first variable parameter and second variable parameter;
      receive, from a node, a retransmitted version of the second data packet, the retransmitted second data packet comprising second feedback data; and
   wherein the processor is configured to optimise the multicasting operation by:
      determining if a time delay between multicasting the first data packet and multicasting the second data packet has reached the maximum time delay; and
      modifying, responsive to the determining, the first variable parameter to optimise the multicasting operation if the first variable parameter is not equal to the maximum time delay, by increasing the minimum time delay between multicasting data packets.

6. The apparatus as claimed in claim 5 wherein, if the time delay between multicasting the first data packet and multicasting the second data packet has reached the maximum time delay, the processor is configured to modify the second variable parameter, to optimise the multicasting operation, by decreasing the maximum data packet size that can be multicast.

7. The apparatus as claimed in claim 1 wherein the feedback data indicates any one or more of: an unspecific problem with the multicasting operation, a specific problem with the multicasting operation, multicasting transmission rate is high, data packet size is large, data packets are being fragmented, minimum retransmission interval is low, a minimum time delay between multicasting data packets needs to be increased, a suggested minimum time delay, a maximum data packet size needs to be decreased, and a suggested maximum data packet size.

8. An apparatus for retransmitting data packets, the apparatus comprising:
at least one processor; and
communication circuitry, coupled to the at least one processor, to:
receive a first multicast data packet from a source apparatus in a communication network;
modify the first multicast data packet by adding feedback data to the first multicast data packet, the feedback data specifying that at least one variable parameter associated with a multicasting operation used to send the first multicast data packet requires modification to optimise the multicasting operation for the network; and
retransmit the modified first multicast data packet.

9. The apparatus as claimed in claim 8 wherein if the communication circuitry receives a second multicast data packet from the source apparatus before retransmitting the received first multicast data packet, the communication circuitry is configured to:
modify the second multicast data packet by adding feedback data to the second multicast data packet, the feedback data specifying that at least one variable parameter of the multicasting operation used to send the first and second multicast data packets requires modification to optimise the multicasting operation for the network; and
retransmit the modified second multicast data packet.

10. The apparatus as claimed in claim 8 wherein the communication circuitry is configured to retransmit the modified multicast data packet to one or more nodes by one or more of: multicasting, unicasting, and broadcasting.

11. The apparatus as claimed in claim 8 wherein the variable parameter of the multicasting operation is a minimum time delay between multicasting data packets, and wherein the communication circuitry is configured to:
add feedback data to the multicast data packet indicating that the minimum time delay needs to be increased to optimise the multicasting operation for the network.

12. The apparatus as claimed in claim 11 wherein the communication circuitry is configured to add a suggested minimum time delay to the multicast data packet.

13. The apparatus as claimed in claim 8 wherein the variable parameter of the multicasting operation is a maximum data packet size that can be multicast, and wherein the communication circuitry is configured to add feedback data to the multicast data packet indicating that the maximum data packet size needs to be decreased to optimise the multicasting operation for the network.

14. The apparatus as claimed in claim 13 wherein the communication circuitry is configured to add a suggested maximum data packet size to the multicast data packet.

15. The apparatus as claimed in claim 8 wherein the communication circuitry is configured to add feedback data to the multicast data packet by performing one or more of: setting a flag in a header of the multicast data packet, modifying a reserved field in the header of the multicast data packet, adding a new header to the multicast data packet, and modifying at least one bit of a field in the header of the multicast data packet.

16. The apparatus as claimed in claim 8 wherein the communication circuitry is configured to add identification data to the multicast data packet, the identification data identifying the apparatus which adds the feedback data.

17. The apparatus as claimed in claim 8 wherein the communication circuitry is configured to:
receive a further multicast data packet;
determine that at least one variable parameter of a multicasting operation used to send the further multicast data packet requires modification to optimise the multicasting operation for the network;
check if the further multicast data packet comprises identification data;
modify, responsive to the check, the further multicast data packet by adding feedback data if the further multicast data packet does not comprise identification data; and
retransmit the modified further multicast data packet.

18. The apparatus as claimed in 17 wherein if the further multicast data packet comprises identification data, the communication circuitry is configured to retransmits the further multicast data packet.

19. The apparatus as claimed in claim 8 further comprising a timer configured to activates when the communication circuitry is configured to retransmit the modified multicast data packet; and wherein the communication circuitry is configured to:
receive a further multicast data packet;
determine that at least one variable parameter of a multicasting operation used to send the further multicast data packet requires modification to optimise the multicasting operation for the network;
check if the timer has expired;
modify, responsive to the check, the further multicast data packet by adding feedback data to the further multicast data packet if the timer has expired; and
retransmit the modified further multicast data packet.

20. A method of optimising a multicasting operation, the method comprising:
multicasting a data packet to a plurality of nodes in a communication network using a multicasting operation and at least one variable parameter associated with the multicasting operation;
receiving, from a node of the plurality of nodes, a retransmitted version of the multicast data packet, the retransmitted data packet comprising feedback data;
determining, using the feedback data, that the variable parameter requires modification to optimise the multicasting operation for the network;
modifying the variable parameter in response to the feedback data; and
storing the modified variable parameter.

* * * * *